US005366268A

United States Patent [19]

Miller et al.

[11] Patent Number: 5,366,268
[45] Date of Patent: Nov. 22, 1994

[54] HIGH STRENGTH SEAT BACK

[75] Inventors: Harold J. Miller, Mt. Clemens; Edward W. Clancy, III, Livonia, both of Mich.

[73] Assignee: General Motors Corporation, Detroit, Mich.

[21] Appl. No.: 131,247

[22] Filed: Oct. 4, 1993

[51] Int. Cl.⁵ .............................................. B60N 2/42
[52] U.S. Cl. ........................... 297/216.1; 297/216.13
[58] Field of Search .......... 297/216.1, 216.14, 378.11, 297/216.13

[56] References Cited

U.S. PATENT DOCUMENTS

| 2,682,931 | 7/1954 | Young | 188/1 |
|---|---|---|---|
| 2,735,476 | 2/1956 | Fieber | 155/9 |
| 2,823,730 | 2/1958 | Lawrence | 155/9 |
| 3,269,774 | 8/1966 | Hildebrandt et al. | 297/386 |
| 3,471,197 | 10/1969 | Ely | 297/385 |
| 3,552,795 | 1/1971 | Perkins et al. | 297/216 |
| 3,578,376 | 5/1971 | Hasegawa et al. | 296/65 |
| 3,734,562 | 5/1973 | Fourrey | 297/216 |
| 3,806,190 | 4/1974 | Winslow | 297/216 |
| 3,832,002 | 8/1974 | Eggert, Jr. et al. | 297/216 |
| 3,832,003 | 8/1974 | Horvat | 297/216.13 |
| 3,853,298 | 12/1974 | Libkie et al. | 248/429 |
| 3,957,304 | 5/1976 | Koutsky et al. | 297/385 |
| 4,183,582 | 1/1980 | Taki | 297/464 |
| 4,325,238 | 4/1982 | Scherbing | 70/18 |
| 4,349,167 | 9/1982 | Reilly | 244/122 R |
| 4,390,208 | 6/1983 | Widmer et al. | 297/379 |
| 4,488,754 | 12/1984 | Heesch et al. | 297/216 |
| 4,775,182 | 10/1988 | Von Hoffman | 297/45 |
| 4,824,171 | 4/1989 | Hollingsworth | 297/351 |
| 5,318,341 | 6/1994 | Griswold et al. | 297/216.13 |

FOREIGN PATENT DOCUMENTS

| 276186 | 7/1988 | European Pat. Off. | 297/378.11 |
|---|---|---|---|
| 3612474 | 1/1988 | Germany | 297/216.1 |

Primary Examiner—Edward K. Look
Assistant Examiner—F. Daniel Lopez
Attorney, Agent, or Firm—Ernest E. Helms

[57] ABSTRACT

A vehicle recliner seat is provided which, in a preferred embodiment, includes a seat bun frame, a seat back frame pivotally mounted with respect to the seat bun frame, an adjuster to selectively adjust the inclination of the seat back frame with respect to the seat bun frame, a strut pivotally mounted to the seat back along a first fixed pivotal axis and having a lost motion pivotal attachment with the seat bun frame, the strut having on an end adjacent to the seat bun frame a pin which is provided for translational movement with respect to the seat bun frame, and the seat bun frame having a pivotal latch and a pendulum to actuate the latch wherein, when the vehicle accelerates rearwardly over a predetermined level of rearward acceleration, the pendulum causes the latch to pivot upwardly to engage the pin, causing the strut to have a fixed pivotal axis with the seat bun frame and thereby tend to limit rearward motion of the seat back frame.

10 Claims, 1 Drawing Sheet

HIGH STRENGTH SEAT BACK

FIELD OF THE INVENTION

The field of the present invention is that of vehicle seats, particularly for vehicle seats in the forward row seating of a multiple-seating-row vehicle.

BACKGROUND OF THE INVENTION

Most of the design restraints associated with vehicle seating are primarily concerned with preventing the vehicle seat from going forward in a frontal impact crash. However, sometimes it is desirable to prevent the front row seat back from possibly going rearwardly. Presently, the main factor which prevents rearward movement of the seat back is the structural integrity of the seat. Preventing possible rearward motion of a seat is harder to obtain when utilizing a reclining seat wherein the seat back in normal operation is allowed to recline rearwardly.

SUMMARY OF THE INVENTION

To meet the above-noted challenge, the present invention in a preferred embodiment brings forth a vehicle seat with an auxiliary strut having a fixed pivotal connection with either the seat back or the seat bun and a lost motion pivotal connection with the other frame member. In situations where the vehicle encounters a rear impact, the lost motion pivotal attachment is latched, thereby causing both ends of the strut to have fixed pivotal axes with the seat back and the seat bun, thereby hindering any further rearward motion of the seat back. However, in normal operation, the strut allows movement of the seat back rearwardly with respect to the seat bun with virtually no interference.

DETAILED DESCRIPTION OF THE PREFERRED EMBODIMENTS

Figures 1, 2, 3:
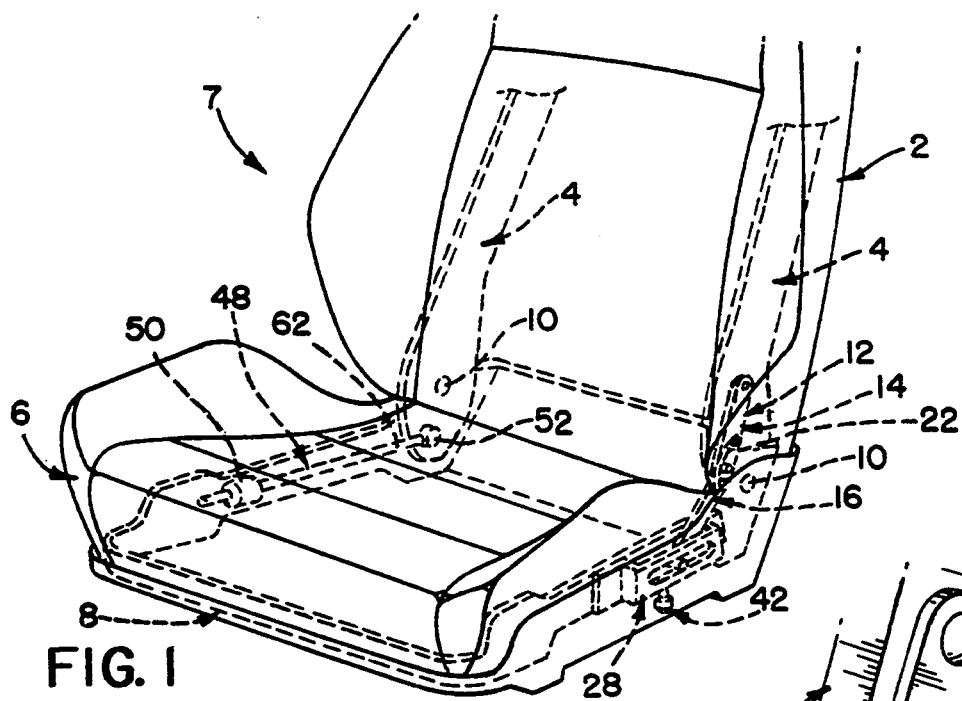
FIG. 1 is a perspective view of a preferred embodiment of the present invention.
FIG. 2 is an enlarged view of the seat shown in FIG. 1 with a portion of the seat being removed for clarity of illustration.
FIG. 3 is a side perspective view of an alternative strut than that shown in FIG. 2.

Referring to FIGS. 1, 2 and 3, a preferred embodiment seat 7 according to the present invention is shown. The seat 7 has a second member seat back 2 which includes a generally inverted U-shaped seat back frame 4. The seat back frame 4 is pivotally connected with respect to a first member seat bun 6 frame 8 along a fixed pivotal axis by pins 10. To adjustably set the inclination of the seat back frame 4 with respect to the seat bun frame 8, there is a linear adjuster actuator 48 having an actuator 50 which is manually or power actuated and an end 62 which is pivotally connected by a pin 52 with the seat back frame 4.

A strut 12 is provided having a first upper rigid link 14 and a second rigid lower link 16. The strut 12 is typically hidden from view by cushion material also covering the seat back frames 4 and 8. In many instances, the strut 12 will be located on the inboard side of tile seat 7. Link 14 at its upper end is pivotally attached along a fixed pivotal axis with the seat back frame 4 by a pin 18. The upper link 14 is pivotally connected by a pin 20 with the lower link 16. A spring member 22 held in grips 24 of the upper and lower links and pressing against the pin 20 biases the links 14 and 16 into a bent position.

The lower link 16 has at its lower end fixably joined thereto a cross pin 26. The cross pin 26 rides in a linear groove 30 provided in a C-channel 28 and in a groove 64 provided within the bun frame 8. Underneath the cross pin 26 is a latch plate 32 having serrated recesses or indentions 38. The latch plate 32 has studs 34 (only one shown) which allow it to be pivotally mounted in apertures 36 (only one shown) in the C-channel 28. Underneath the latch 32 is a pendulum 42 of approximately 10 grams having a stem 44 connected with a button 46. The pendulum button 46 is supported on a platform 40 which is, in turn, suspended from the lower side of the C-channel 28.

During normal operation, a seat occupant via an actuator 50 will either extend or retract the actuator 48 to adjustably set the inclination of the seat back frame 4. During normal operation, the pin in the lower strut link 16 will freely slide within the oblong grooves 64 and 30. There will be virtually no effect upon the operation of the recliner mechanism by the strut 12.

In instances of a rapid forward acceleration of the vehicle in the range of 64 ft/sec$^2$ (typically exceeded in a rear impact), the pendulum 42 will swing to the position shown in phantom. The pivoting of the pendulum 42 causes the button 46 to tilt and thereby lift up the bottom of the latch 32. Latch 32 will be actuated to pivot upwardly to the position shown in phantom until one of the indentions 38 surrounds the pin 26. At this point, the bottom link 16 will now have a fixed pivotal connection with the bun frame 8. Continued rearward motion of the seat back will be limited at the point where the upper link 14 and the lower link 16 are aligned straight with one another, making a three-sided truss with respect to pins 26, 18 and 10. When this point is reached, further rearward motion of the seat back frame 4 is greatly hindered and can only occur by elastic deformation of the strut 12 and/or the seat back frame 4 or the bun frame 8. The forward acceleration of the vehicle, which determines the actuation of the latch 32, can be set by setting the weight associated with the pendulum 42.

Referring to FIG. 3, an alternative preferred embodiment is shown wherein the strut 11 is a single curved member, rather than two separate links. This configuration may be found to be preferable since it is easy to hide the single strut member within the seat cushioning.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A recliner seat for a vehicle comprising:
   a first frame member providing a bun frame;
   a second frame member providing a seat back frame pivotally mounted with respect to the first frame member;
   means to adjust the inclination of the second frame member with respect to the first frame member;
   a strut pivotally mounted to one of the frame members along a fixed pivotal axis, the strut having means of lost motion pivotal attachment with the other frame member;

latch activation means to cause latch means to prevent translational movement of the pivotal attachment of the strut with the other frame member, when the vehicle accelerates forwardly over a predetermined level of acceleration, causing the strut to tend to limit further rearward motion of the seat back.

2. A vehicle seat as described in claim 1 wherein the fixed pivotal mounting of the strut with one of the seat frame members is with the seat back frame.

3. A vehicle seat as described in claim 1 wherein the latch actuation means includes a pendulum.

4. A vehicle seat as described in claim 1 wherein the strut is comprised of one member.

5. A vehicle seat as described in claim 1 wherein the strut is a two-piece member, the first member being pivotally connected to the second member.

6. A vehicle seat as described in claim 5 wherein the strut has a spring biasing the strut into a bent position.

7. A vehicle seat as described in claim 1 wherein the means of lost motion pivotal attachment of the strut with the other frame member includes the strut having an attached pin and wherein there is a latch member pivotally attached with the other frame member which has a pivotal position of engagement with the pin.

8. A recliner seat for a vehicle comprising:
a seat bun frame;
a seat back frame pivotally mounted with respect to the seat bun frame;
an adjuster to selectively adjust the inclination of the seat back frame with respect to the seat bun frame:
a strut pivotally mounted to the seat back along a first fixed pivotal axis and having a lost motion pivotal attachment with the seat bun frame, the strut having on an end adjacent to the seat bun frame a pin which is provided for translational movement with respect to the seat bun frame, and the seat bun frame having a pivotal latch and a pendulum to actuate the latch wherein, when the vehicle accelerates forwardly over a predetermined level of forward acceleration, the pendulum causes the latch to pivot upwardly to engage the pin, causing the strut to have a fixed pivotal axis with the seat bun frame and thereby tend to limit rearward motion of the seat back frame.

9. A vehicle seat as described in claim 8 wherein the strut is a two-piece member having the first and second pieces pivotally connected with one another and being spring biased to a bent position.

10. A method of limiting angular rearward motion of a vehicle recliner seat back during a vehicle forward acceleration level greater than a predetermined amount the method comprising:
pivotally mounting a second seat frame member providing a seat back frame with respect to a first frame member providing a seat bun frame with means to adjust the inclination of a second frame member with respect to the first frame member;
pivotally mounting to one of the frame members along a fixed pivotal axis a strut;
providing lost motion pivotal attachment of the strut with the other frame member; and
latching the strut to prevent linear movement of the pivotal mounting of the strut to the other frame member with which the strut has lost motion pivotal attachment when the vehicle accelerates forwardly over a predetermined level, thereby tending to limit rearward motion of the seat back.

* * * * *